United States Patent
Phillips et al.

(10) Patent No.: US 11,280,430 B2
(45) Date of Patent: Mar. 22, 2022

(54) PIPE SUPPORT

(71) Applicant: Southwest Agri-Plastics, Inc., Dallas, TX (US)

(72) Inventors: Paul D. Phillips, Frisco, TX (US); Victor A. Sahm, III, Dallas, TX (US); Matthew A. Hanson, Celina, TX (US)

(73) Assignee: DuraPlas, LP, Dallas, TX (US)

( * ) Notice: Subject to any disclaimer, the term of this patent is extended or adjusted under 35 U.S.C. 154(b) by 0 days.

(21) Appl. No.: 16/508,556

(22) Filed: Jul. 11, 2019

(65) Prior Publication Data

US 2020/0018425 A1 Jan. 16, 2020

Related U.S. Application Data

(60) Provisional application No. 62/697,366, filed on Jul. 12, 2018.

(51) Int. Cl.
*F16L 3/02* (2006.01)
*F16L 3/08* (2006.01)
*B65D 21/02* (2006.01)

(52) U.S. Cl.
CPC ...... *F16L 3/02* (2013.01); *F16L 3/08* (2013.01); *B65D 21/0233* (2013.01)

(58) Field of Classification Search
CPC ..... F16L 3/02; F16L 3/08; F16L 3/123; F16L 3/26; F16L 1/0243; F16L 1/0246; F16L 1/106; F16L 1/028; B65D 21/0233; E04C 5/16; E04C 5/20; E04C 5/206; E04C 5/168; B65H 57/16; B63B 59/02; A62B 35/0081

USPC ... 248/49, 74.1, 55, 68.1, 76.2, 76.4, 62, 73, 248/65, 75, 80, 346.01, 346.03, 351, 248/346.5, 188.1, 188.2; 52/677, 683, 52/684, 685, 686, 682, 687; 351/357

See application file for complete search history.

(56) References Cited

U.S. PATENT DOCUMENTS

| | | | | |
|---|---|---|---|---|
| 3,026,076 A | * | 3/1962 | Bender | F16L 3/1218 248/49 |
| 3,993,192 A | | 11/1976 | Bunn | |
| 4,060,954 A | | 12/1977 | Liuzza | |
| 4,183,495 A | * | 1/1980 | Adam | F16M 11/041 248/188.8 |

(Continued)

FOREIGN PATENT DOCUMENTS

JP 06-017971 2/1994

OTHER PUBLICATIONS

Non-Final Office Action on U.S. Appl. No. 29/676,359 dated Nov. 5, 2019.

(Continued)

*Primary Examiner* — Nkeisha Smith
(74) *Attorney, Agent, or Firm* — Foley & Lardner LLP

(57) ABSTRACT

A pipe support for supporting a pipe section above a ground surface, the pipe support including an upper support surface and at least one sidewall extending from the upper support surface to a base member. The upper support surface and the at least one sidewall form a hollow interior. The pipe support further includes a saddle formed in the upper support surface, the saddle recessed within the support surface to support a pipe therein. The saddle includes a first end and an opposed second end such that at least one of the first end or the second end angularly extends toward the base member.

8 Claims, 7 Drawing Sheets

(56) References Cited

U.S. PATENT DOCUMENTS

| | | | | |
|---|---|---|---|---|
| 4,502,653 | A * | 3/1985 | Curtis, Jr. | F16L 3/18 248/55 |
| 4,513,934 | A | 4/1985 | Pruyne | |
| 4,655,023 | A | 4/1987 | Yung | |
| 4,687,185 | A | 8/1987 | Urano et al. | |
| 4,899,963 | A * | 2/1990 | Murphy | F16L 3/137 24/16 R |
| D315,668 | S | 3/1991 | Murphy | |
| 5,107,654 | A | 4/1992 | Leonardis | |
| D336,843 | S | 6/1993 | Hurst | |
| 5,533,696 | A | 7/1996 | Laughlin et al. | |
| 5,729,940 | A | 3/1998 | Bullivant | |
| D399,727 | S | 10/1998 | Richter | |
| D408,726 | S | 4/1999 | Vallee | |
| 6,089,522 | A | 7/2000 | Haslem et al. | |
| D436,522 | S * | 1/2001 | Neider | D8/380 |
| 6,364,256 | B1 * | 4/2002 | Neider | F16L 3/18 248/55 |
| 6,520,456 | B1 | 2/2003 | Neider et al. | |
| 6,663,316 | B1 | 12/2003 | Harris | |
| 6,669,151 | B2 * | 12/2003 | Mascadri | F16L 3/233 248/65 |
| 6,684,595 | B1 | 2/2004 | Sorkin | |
| 6,708,824 | B2 * | 3/2004 | Sahm, III | B65D 1/42 206/505 |
| D493,095 | S | 7/2004 | Sittig | |
| D493,096 | S | 7/2004 | Sittig | |
| D500,243 | S | 12/2004 | Turek | |
| 6,925,771 | B2 | 8/2005 | Lee et al. | |
| 6,962,029 | B2 | 11/2005 | Lowery et al. | |
| 7,007,978 | B1 | 3/2006 | Purdom | |
| 7,028,443 | B2 | 4/2006 | Bennett et al. | |
| D521,851 | S | 5/2006 | Smart | |
| 7,278,613 | B2 * | 10/2007 | Roy | F16L 3/02 248/49 |
| D578,379 | S | 10/2008 | Sorkin | |
| D578,870 | S | 10/2008 | Sorkin | |
| 7,441,731 | B2 * | 10/2008 | Smart | F16L 3/02 248/68.1 |
| 7,458,192 | B2 | 12/2008 | Lowery | |
| 7,461,491 | B1 | 12/2008 | Sorkin | |
| 7,607,619 | B2 * | 10/2009 | Smart | F16L 3/04 248/68.1 |
| 7,661,240 | B2 | 2/2010 | Sargent | |
| 7,669,381 | B1 | 3/2010 | Sorkin | |
| 7,731,131 | B2 | 6/2010 | Trueb | |
| D629,533 | S | 12/2010 | Ward et al. | |
| D649,434 | S | 11/2011 | Lalancette et al. | |
| 8,312,692 | B2 | 11/2012 | Krovats | |
| 8,322,108 | B2 | 12/2012 | Lee et al. | |
| 8,807,492 | B2 | 8/2014 | Lake | |
| D715,623 | S | 10/2014 | Holtby et al. | |
| 8,863,468 | B1 * | 10/2014 | Perry | E04C 5/168 52/686 |
| 8,910,803 | B2 * | 12/2014 | Holtby | F16L 1/0246 211/70.4 |
| 8,931,977 | B2 * | 1/2015 | Connors | F16L 3/00 405/184.4 |
| D737,665 | S | 9/2015 | Kwakkel | |
| D741,151 | S | 10/2015 | Iseminger | |
| 9,228,350 | B1 | 1/2016 | Perry et al. | |
| D758,834 | S | 6/2016 | Tally | |
| 9,477,295 | B2 | 10/2016 | Jreji et al. | |
| 9,488,295 | B2 * | 11/2016 | Holtby | F16L 1/0246 |
| D791,579 | S | 7/2017 | Perry et al. | |
| 9,726,303 | B1 | 8/2017 | Gretz | |
| 9,765,905 | B2 | 9/2017 | Connors et al. | |
| D807,729 | S | 1/2018 | Willshare et al. | |
| 10,066,404 | B2 * | 9/2018 | Parodi | E04G 9/086 |
| D837,638 | S | 1/2019 | Sargent et al. | |
| D839,481 | S | 1/2019 | Seutter | |
| 10,273,694 | B2 | 4/2019 | Wright et al. | |
| D852,354 | S | 6/2019 | Wrangmark et al. | |
| D856,119 | S * | 8/2019 | McGugan | D8/356 |
| D883,774 | S | 5/2020 | Comalander | |
| D883,775 | S | 5/2020 | Wojcik et al. | |
| D889,943 | S * | 7/2020 | Phillips | D8/356 |
| 2003/0089829 | A1 | 5/2003 | Brandzel et al. | |
| 2004/0098942 | A1 | 5/2004 | Lee et al. | |
| 2004/0261352 | A1 | 12/2004 | Bennett et al. | |
| 2006/0091265 | A1 | 5/2006 | Smart | |
| 2006/0131469 | A1 | 6/2006 | Roy | |
| 2007/0045482 | A1 | 3/2007 | Smart | |
| 2007/0193189 | A1 * | 8/2007 | Bennett | E04C 5/20 52/677 |
| 2007/0210215 | A1 | 9/2007 | Prest | |
| 2008/0009165 | A1 | 1/2008 | Tseng | |
| 2008/0028718 | A1 | 2/2008 | Erickson et al. | |
| 2008/0054143 | A1 | 3/2008 | Collins et al. | |
| 2009/0044481 | A1 | 2/2009 | Turek | |
| 2009/0277913 | A1 | 11/2009 | Bergman | |
| 2010/0258687 | A1 | 10/2010 | Celikkol | |
| 2011/0214381 | A1 | 9/2011 | Alfonso | |
| 2012/0152961 | A1 | 6/2012 | Diblasi et al. | |

OTHER PUBLICATIONS

Prostand Products Brochure, "Pipeland Stand/Skid Systems," 3 pages.

\* cited by examiner

PIPE SUPPORT

CROSS REFERENCE TO RELATED APPLICATIONS

This application claims the benefit of U.S. Provisional Patent Application No. 62/697,366, entitled "Pipe Support", filed Jul. 12, 2018, which is hereby incorporated by reference in its entirety for all purposes.

TECHNICAL FIELD

This disclosure relates generally support members for supporting pipeline and in particular, support member for supporting a pipeline during assembly and installation when in the trench and out of the trench.

BACKGROUND

Installing buried pipelines generally includes digging a trench for the pipeline and laying out sections of pipe end to end and adjacent to the trench line. Once laid out, the process includes joining the sections of pipe into a continuous pipeline, next placing the pipeline into the trench, and finally, backfilling the trench. However, the pipeline must be held off the ground during the pipeline assembly process, the joining together of the individual sections of pipe, and upon installation of the pipeline in the trench. During the pipeline joining process, the sections of pipe are generally supported off the ground to prevent pipe and coating damage as well as to provide full and easy access to each pipe joint for joining.

There are many methods of supporting the pipes outside the trench prior to joining. For example, large and heavy wooden skids may be used or large plastic support members may be used. However, many existing devices are not sturdy, frequently fail, are heavy, costly, and difficult to store and/or transport. Thus, there is a need to overcome these disadvantages.

SUMMARY

According to a first aspect, there is provided a pipe support for supporting a pipe section above a ground surface, the pipe support including an upper support surface and at least one sidewall extending from the upper support surface to a base member. The upper support surface and the at least one sidewall form a hollow interior. The pipe support further includes a saddle formed in the upper support surface, the saddle recessed within the support surface to support a pipe therein. The saddle includes a first end and an opposed second end such that at least one of the first end or the second end angularly extends toward the base member.

According to another aspect, there is provided a pipe support for supporting a pipe section above a ground surface. The pipe support includes an upper support surface and at least one sidewall extending from the upper support surface to a base member. The upper support surface and the at least one sidewall are configured to form a hollow interior. A saddle is formed in the upper support surface, the saddle being recessed within the support surface to support a pipe therein. The base member includes upturned ends angularly extending toward the upper support surface.

According to yet another aspect, there is provided a pipe support for supporting a pipe section above a ground surface. The pipe support includes an upper support surface and a sidewall extending from the upper support surface to a base member. The upper support surface and the sidewall form a hollow interior. An inner support member extends from the upper support surface and into the hollow interior. The inner support member formed having an inner support sidewall and an inner support bottom wall forming an inner support hollow interior. The pipe support further includes a least one drain opening formed onto the inner support sidewall, the drain opening providing a passageway to facilitate the draining of fluid collecting inside the inner support member.

According to yet another aspect, there is provided a pipe support for supporting a pipe section above a ground surface, the pipe support including an upper support surface and a sidewall extending from the upper support surface to a base member, the upper support surface and the sidewall form a hollow interior. The pipe support further includes an inner support member extending from the upper support surface and into the hollow interior, the inner support member formed having an inner support sidewall and an inner support base forming an inner support hollow interior. At least one handle is formed on the inner support sidewall for lifting the pipe support.

DETAILED DESCRIPTION

Figure 1:
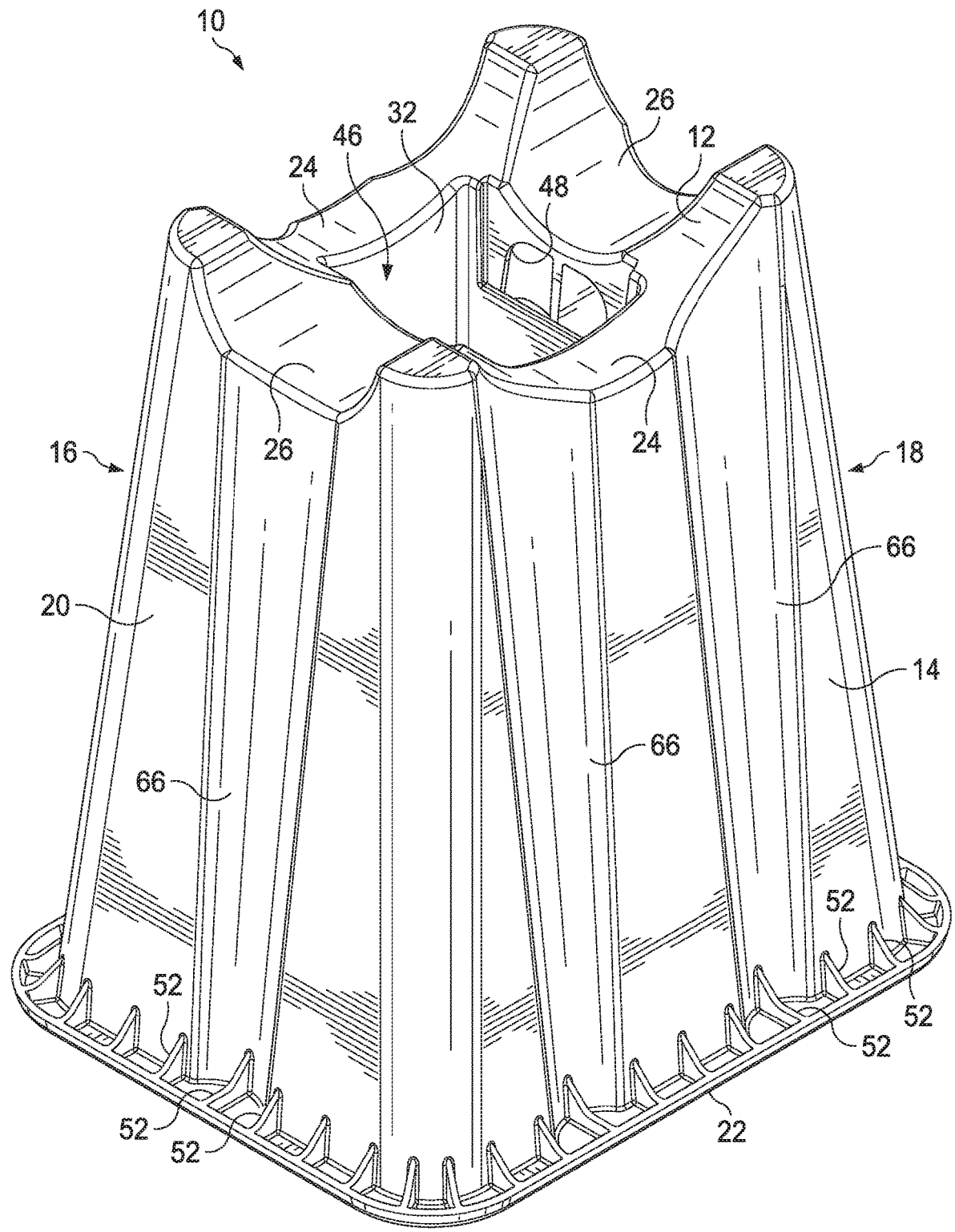
FIG. 1 is a front perspective view of an embodiment of a pipe support.

FIG. 1 is a perspective view of an embodiment of a pipe support 10 for supporting piping above the ground while, for example, along a trench or when inside a trench. In the embodiment illustrated in FIG. 1, the pipe support 10 is formed having a pipe/upper support surface 12 a front wall 14, a rear wall 16 and a pair of sidewalls 18 and 20 for supporting a pipe. As illustrated, for example, in FIG. 1, front wall 14, rear wall 16 and sidewalls 16 and 18 are inwardly sloped to facilitate, as discussed in greater detail below, stacking of multiple pipe supports 10 for storage and/or transport.

In the embodiment illustrated in FIG. 1, the pipe support 10 comprises a generally rectangular base 22 formed by sidewalls 18 and 20 that are shorter in length than front and rear walls 14 and 16. It should be understood, however, that base 22 may be otherwise shaped. For example, base 22 may be square, in which walls 14, 16, 18 and 20 are all of the same length. In other embodiments, by way of example, the base 22 may be circular having a single sidewall that conically extends upward to the upper support surface 12.

In the embodiment illustrated in FIG. 1, the upper the upper support surface 12, includes a pair of saddles 24 and 26 extending perpendicularly with respect to each other. As illustrated, the saddles 24 and 26 are curved to support and/or otherwise cradle a pipe (not illustrated) thereon. In the embodiment illustrated in FIG. 1, saddle 24 is sized having a diameter that is longer than the diameter of the saddle 26. While the upper support surface 12 of FIG. 1 contains two saddles 24 and 26, it should be understood that a greater or fewer number of saddles 24 and 26 may be utilized. For example, according to one embodiment, only a single saddle is utilized. In other embodiments, three or more saddles can be utilized having differing diameters to accommodate and otherwise support pipes of differing diameters.

Figure 2:
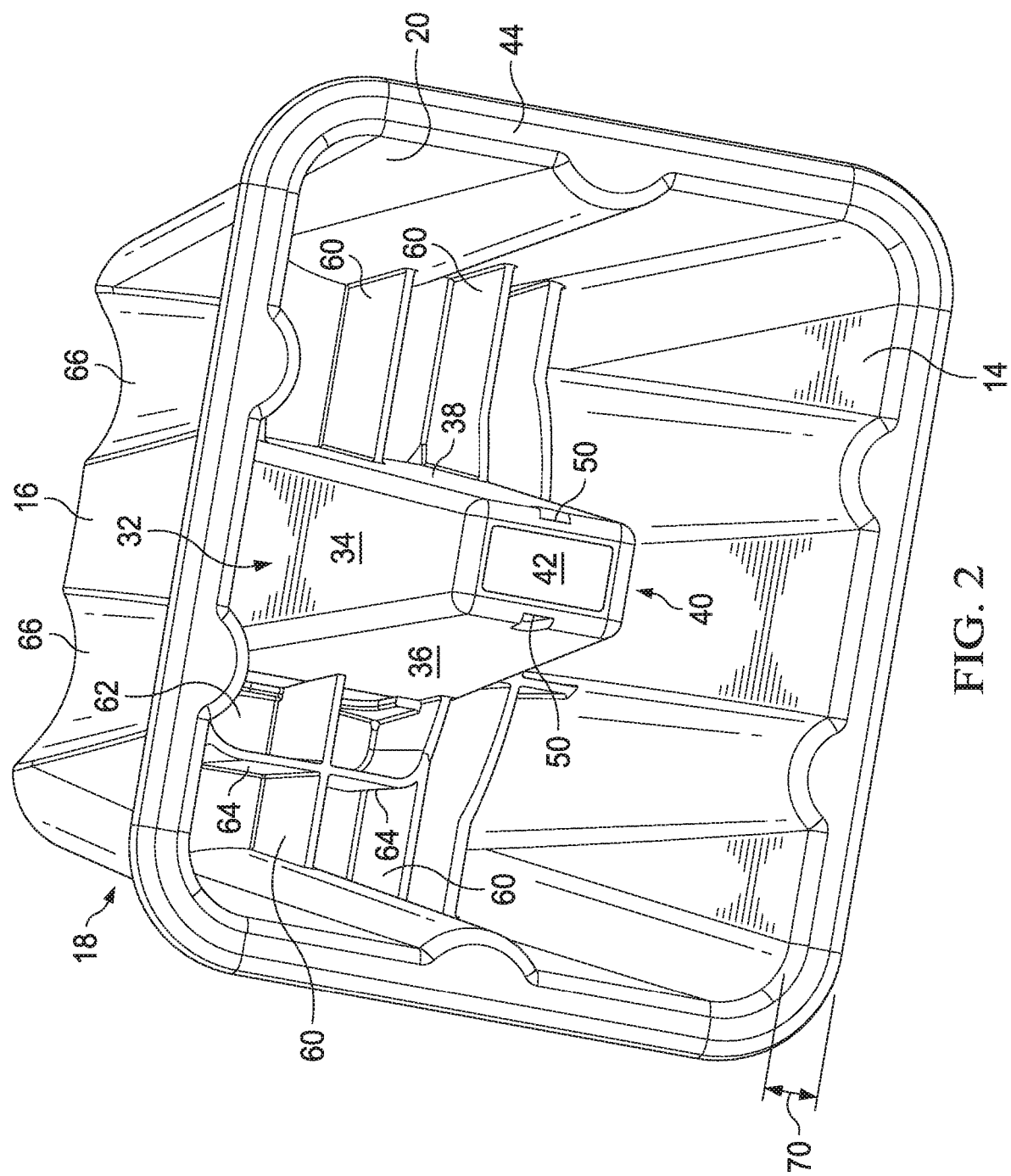
FIG. 2 is a bottom perspective view of the pipe support of FIG. 1.

With reference to FIGS. 1 and 2, an inner support member 32 is employed to advantage. In the embodiment illustrated in FIGS. 1 and 2, the inner support member 32 extends from the upper support surface 12 downward toward the base 22 to provide additional support for the pipe support 10 when a pipe rests on and is otherwise supported on the upper support surface. The inner support member 32 is formed having sidewalls 34, 36, 38 and 40 and a bottom wall 42. In FIG. 2, the sidewalls 34-40 extend a length such that the bottom wall 42 is generally on the same plane as a bottom surface 44 of the base 22. As illustrated, the sidewalls 34-40 form a hollow interior 46 and inwardly slope such that the cross-sectional area of the hollow interior 46 gradually decreases towards the bottom wall 42. In the embodiment illustrated in FIG. 2, the cross-sectional shape of the inner support member 32 is generally rectangular, however, it should be understood that other cross-sectional shapes can be utilized. For example, in some embodiments, the cross-sectional shape of the inner support member 32 is square. In other embodiments, the cross sectional shape of the inner support member is circular. In other embodiments, as an example, the cross sectional shape is oval. According to some embodiments, the cross-sectional shape of the inner support member 32 may be constant such that the sidewalls 34-40 extend downward toward the base 22 in a generally vertical configuration.

In the embodiment illustrated in FIGS. 1 and 2, the pipe support 10 includes a handle 50 formed in the sidewall 34. In use, handle 48 may be used to grip the pipe support 10 in order to carry the pipe support 10 to its desired location. The handle 48 may be otherwise positioned, such as for example, on sidewalls 36, 38 or 40 or combinations thereof. In other embodiments, in addition to or in lieu of the handle 48 being disposed on the inner support member 32, the handle 48 may be disposed on any or all of the walls 14-20. As illustrated in FIGS. 1 and 2, the handle 48 is formed as an opening extending through the wall 34.

With continued reference to FIG. 2, the inner support member 32 includes a drain opening 50 disposed on walls 36 and 38 to such that in the event rain or other moisture collects inside the hollow interior 46, it can drain through the opening 50. This is especially important in the event that the pipe-stand is subjected to freezing temperatures. If liquid that collects at the bottom of the inner support member 32 freezes, the expansion of that liquid may cause damage to the inner support member 32. In the embodiment illustrated in FIG. 2, two drain openings 48 are illustrated, however, a greater or fewer number of drain openings 50 may be utilized. For example, each wall 34-40 may utilize one or more drain openings 48. In other embodiments, the bottom wall 42 may include one or more drain openings 50.

In the embodiment illustrated in FIG. 2, the pipe support 10 includes a plurality of reinforcing ribs 60 extending from the underside 62 of the upper support surface 12 to provide extra rigidity and strength to the upper support surface 12. As illustrated, reinforcing ribs 60 extend between and connect the sidewalls 18, 20 and the inner support member 32.

In FIG. 2, the pipe support 10 includes six reinforcing ribs: three parallel ribs 60 extending between sidewall 18 and the inner support member 32 and three parallel ribs 60 extending between the sidewall 20 and the inner support member 32. It should be understood that a greater or fewer number of ribs 60 may be utilized. Furthermore, such ribs 60 may extend in a non-parallel fashion to provide extra support to the pipe support 10. For example, the pipe support 10 may include four ribs 60 extending from each corner of the pipe support 10 (i.e., at the intersection of the front wall and rear wall 14 and 16 with the sidewalls 18 and 20, respectively) to the respective corners of the inner support member 32. Furthermore, in the embodiment illustrated in FIG. 2, transverse ribs 64 may extend between ribs 60, as illustrated in FIG. 2, or example. As discussed in greater detail below, in come embodiments, the ribs 60 and/or 62 act as spacers such that when multiple pipe-stands 10 are stacked, the pipe-stands can be more easily pulled apart.

With continued reference to FIGS. 1 and 2, each wall 14, 16, 18 and 20 include at least one recessed area 66 extending longitudinally between the upper support surface 12 and the base 22. In addition to providing additional rigidity to the pipe support 10, recessed areas 66 assist in aligning multiple pipe-stands when stacking. In the embodiment illustrated in FIGS. 1 and 2, each recessed area 66 is semi-circular shaped with a diameter decreasing in size as the slot approaches the base 22; however, it should be understood that the recessed areas 66 may be otherwise shaped and sized.

Figure 3:
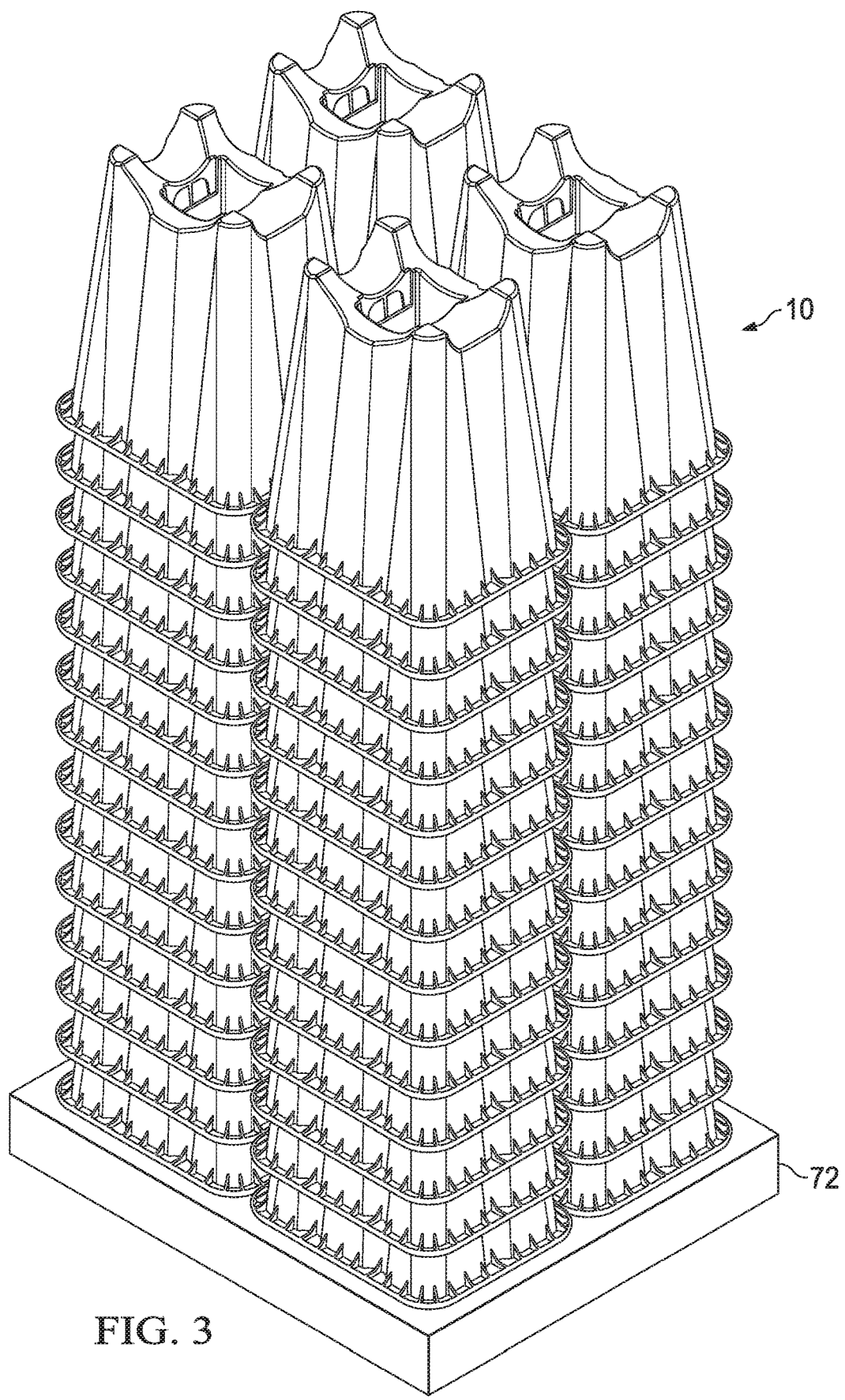
FIG. 3 is a perspective view of a plurality of pipe support in a stacked configuration for transport on a pallet.
Figure 4:
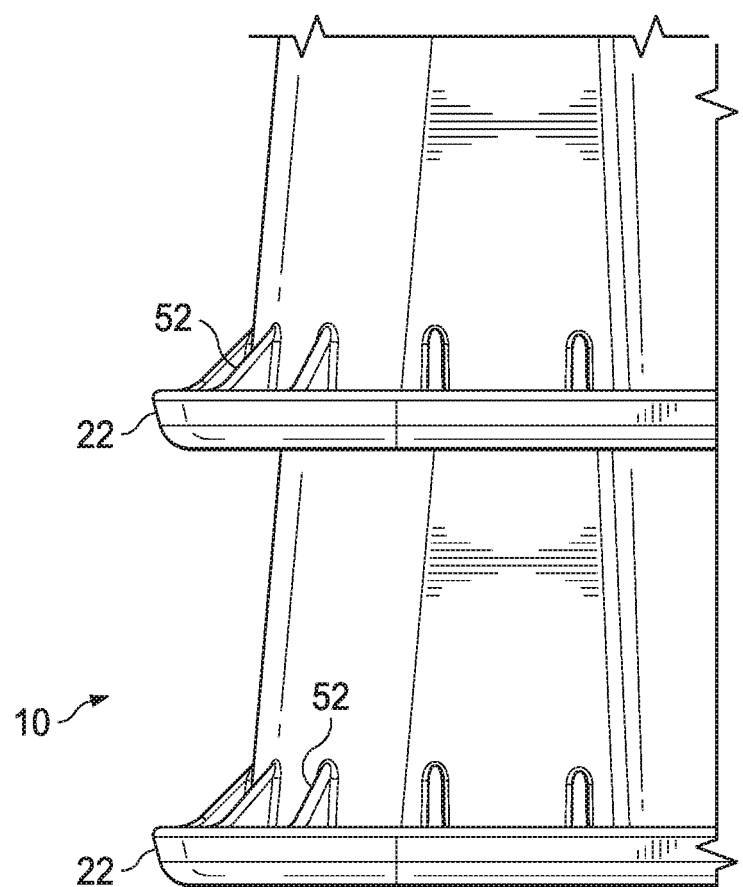
FIG. 4 is a detail view of the pipe support of FIG. 3.

According to some embodiments, the base 22 includes a bottom surface 68 having a desired width 70 (FIG. 2) such that when the pipe support 10 is supported on the ground surface, the combined weight of the pipe (not illustrated) and the pipe support 10 is transferred to, in addition to the inner support member 32, the walls 14-20 and through the bottom flange 68. Referring specifically to FIGS. 1 and 3, the base 22 includes a plurality of spaced apart reinforcing ribs 52 to provide additional rigidity to the base 22.

According to embodiments disclosed herein, the outward sloping walls 14-20 and the inward sloping walls 34-40, coupled with the recessed areas 66 extending longitudinally along the walls 14-20 facilitate stacking of multiple pipe supports 10. Referring specifically to FIG. 3, multiple pipe supports 10 are stacked on a pallet 72 for ease of transport and/or storage. In FIG. 3, the size of the pipe supports 10 are such that four stacks of pipe supports 10 can be adjacently positioned onto the pallet 72. It should be understood, however, that the pipe supports can be of a different size such that, for example, in the event they are smaller, more stacks can be stored on the pallet 72, or they can be larger, such that a fewer number of stacks can be accommodated on the pallet 72.

Figure 5:
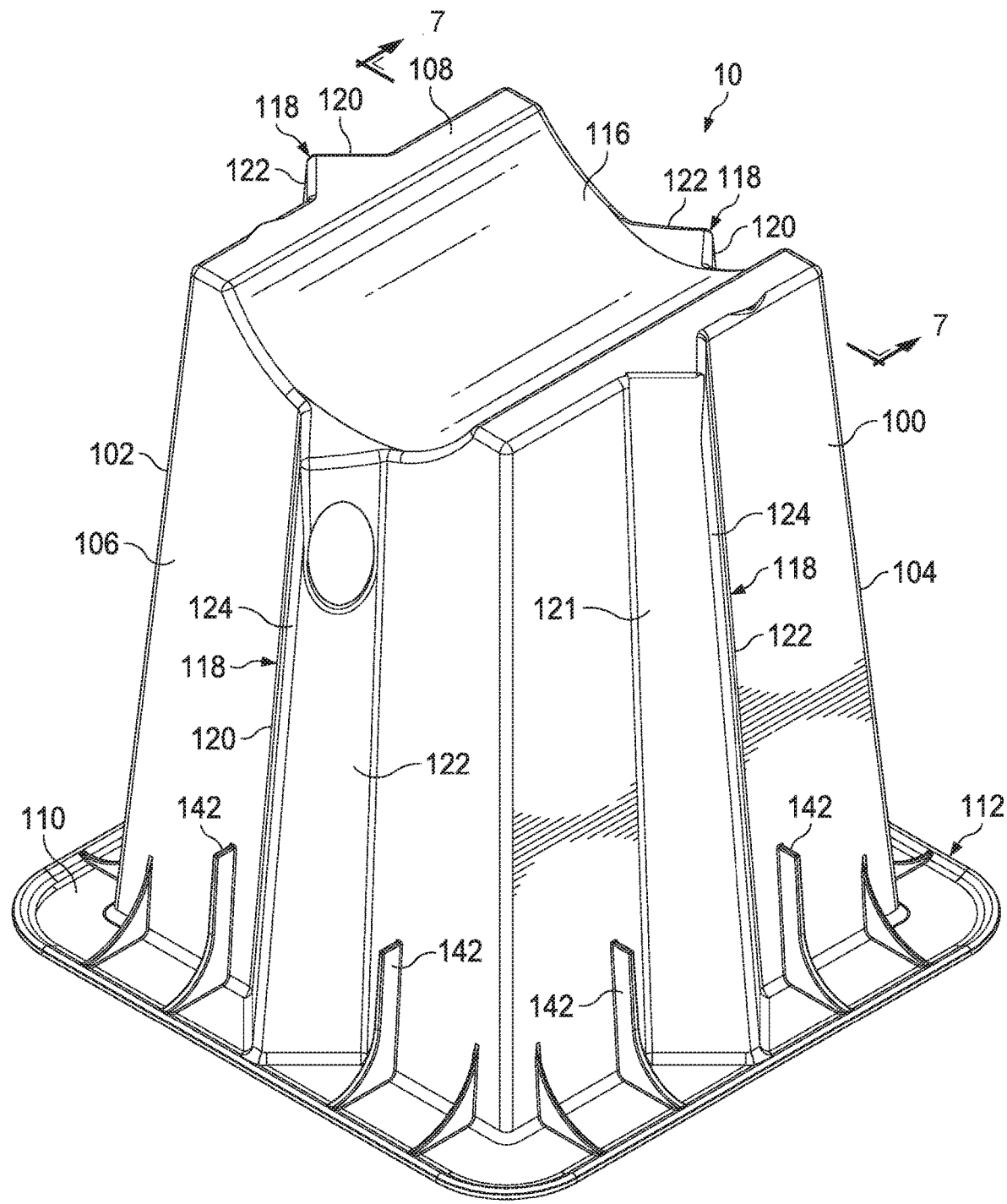
FIG. 5 is a front perspective view of another embodiment of a pipe support.
Figure 6:
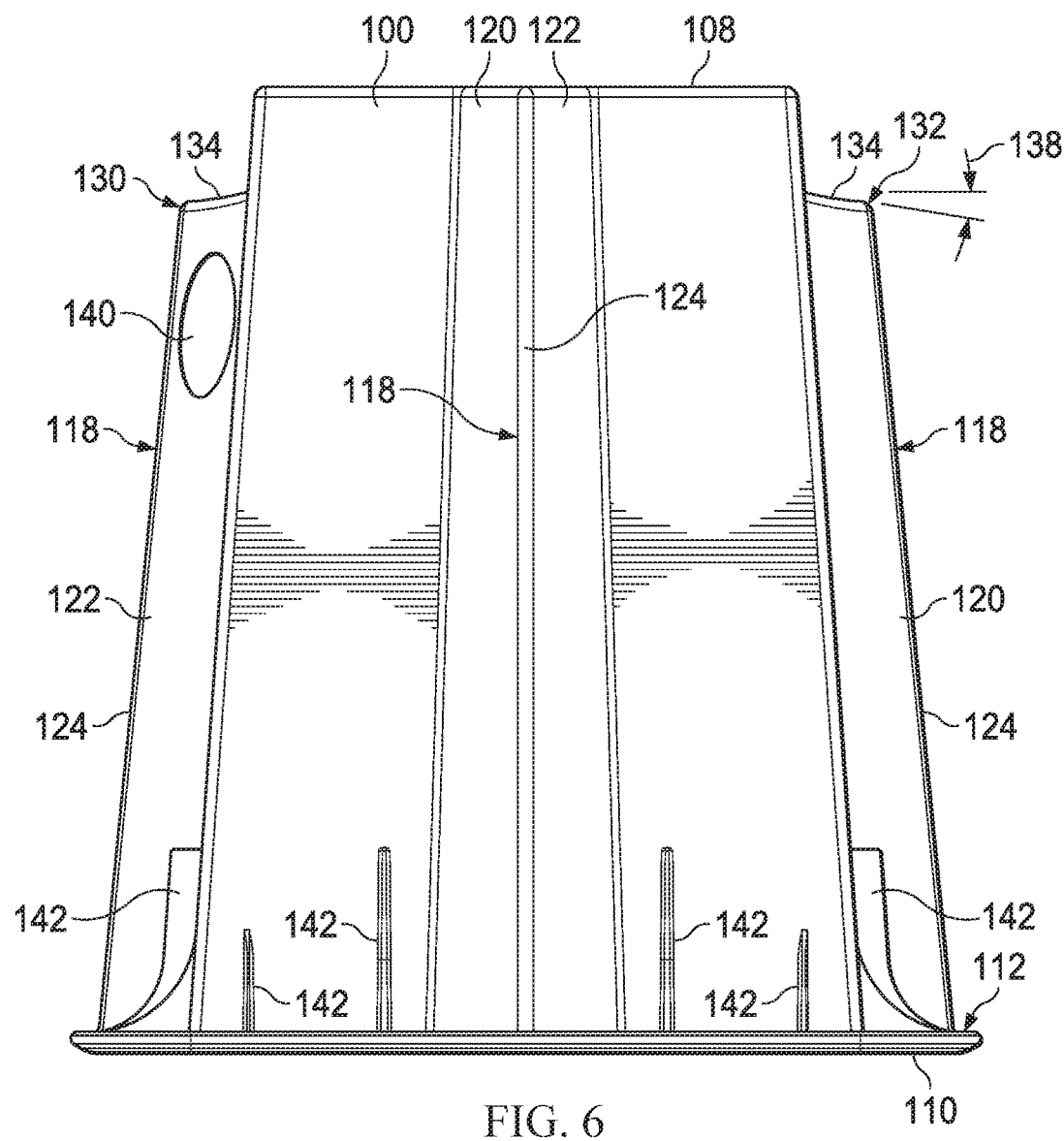
FIG. 6 is a side view of the pipe support of FIG. 5.
Figure 7:
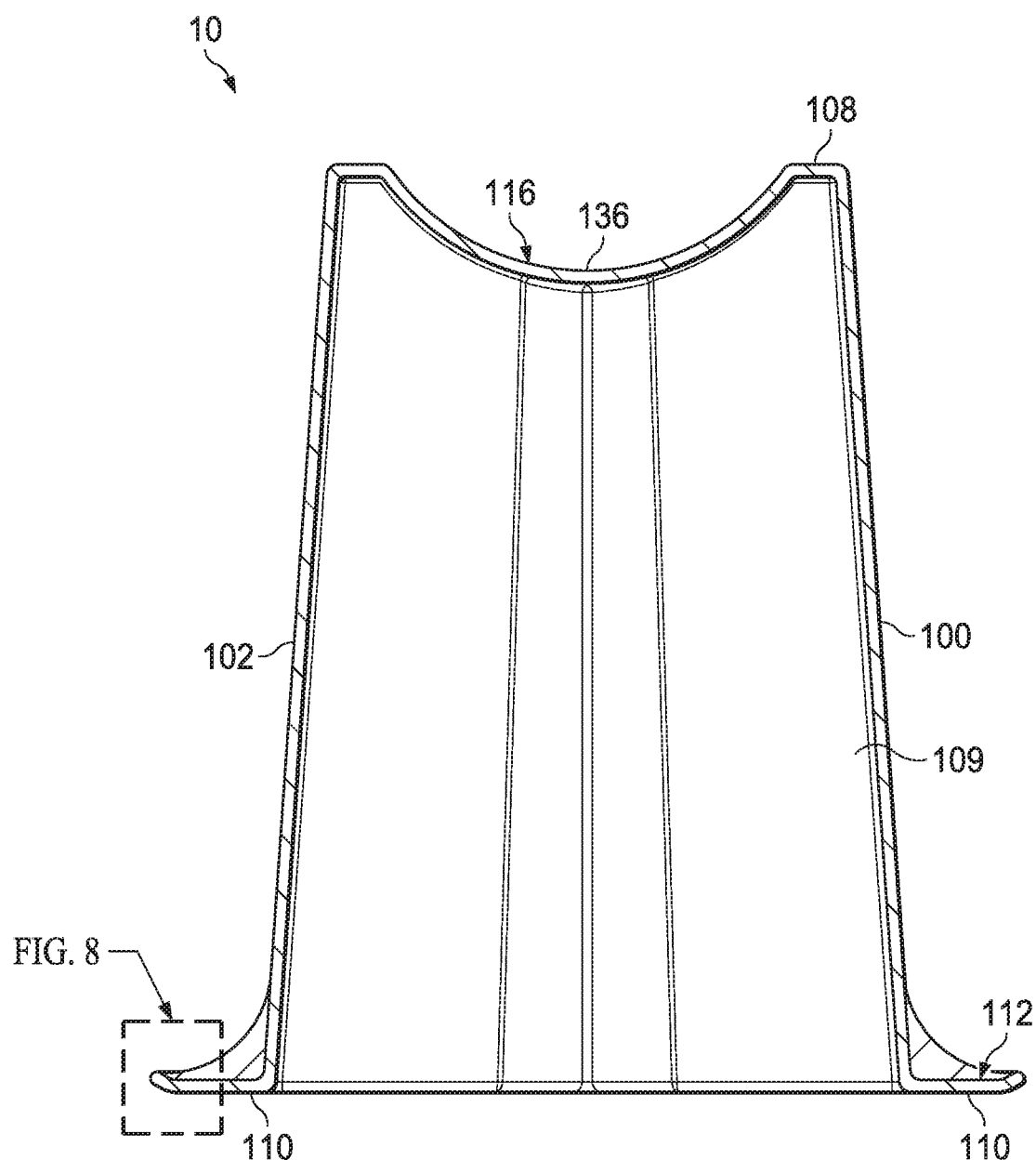
FIG. 7 is a section view of the pipe support of FIG. 5 taken along the line 7-7.

Referring now to FIG. 5, an alternate design of pipe support 10 is provided. In the embodiment illustrated in FIG. 5, the pipe stand 10 includes a front wall 100, a rear wall 102, a pair of side walls 104 and 106, a top wall or support surface 108 and an opposed bottom wall 110 forming a base 112. In the embodiment illustrated in FIG. 5, the pipe support 10 comprises a generally square base 112 formed by walls 100, 102, 104 and 106 of equidistant length. It should be understood, however, that the base 112 may be otherwise shaped. For example, base 112 may be rectangular, oval, circular, or any other desired configuration. In FIGS. 5-7 the base 112 extends outward from the walls 100, 102, 104 and 106, and as explained in greater detail below, is formed to allow tilting of the pipe support 10 during use.

Similar to the embodiment illustrated in FIGS. 1-4, the walls 100, 102, 104 and 106 angularly extend from the top surface 108 outward forming a hollow interior 109 to facilitate stacking of multiple pipe supports 10. In FIG. 5, for example, the walls 100, 102, 104 and 106 extend angularly outward from the top surface 108 such that a cross sectional area of the pipe support 10 gradually increases as it approaches the base 112. In operation, the increase in cross-sectional area acts to resist tilting of the pipe support 10.

In the embodiment illustrated in FIGS. 5 and 7, the support surface 108 includes at least one saddle 116. As illustrated, the saddle 116 is curved to support and/or otherwise cradle a pipe thereon. While the support surface 108 of FIG. 5 contains one saddle 116, it should be understood that a greater number of saddles 116 may be utilized. For example, according to one embodiment, only a single saddle 116 is utilized. However, two, three or more saddles can be utilized, with at least some of the saddles 116 having differing diameters to accommodate and otherwise support pipes of differing diameters.

Referring now to FIGS. 5 and 6, each of the walls 100, 102, 104 and 106 have at least one protrusion or rib 118 extending therefrom. In the embodiment illustrated in FIGS. 5 and 6, for example, each wall 100, 102, 104 and 106 has one protrusion forming a star-like cross section of the pipe support 10. Referring specifically to FIG. 5, each rib 118 is formed integral with respective sidewalls 100, 102, 104 and 106 and is generally triangular in cross-sectional shape such that walls 120 and 122 intersect and/or otherwise meet at an apex or point 124. It should be understood, however, that ribs 118 may be otherwise configured. For example, each rib 118 may be one continuous curved sidewall, rectangular having more than two sidewalls, or any other configuration of combination thereof. In the embodiment illustrated in FIGS. 5 and 6, each rib 118 extends continuously from and between the top surface 108 to the base 112. It should be understood, however, that each rib 118 may extend only partially between the top surface 106 and the base 112. Furthermore, while each wall 100, 102, 104 and 106 contains a single rib 118, it should be understood that walls 100, 102, 104 and/or 106 may contain no rib 118, multiple ribs 118, or any combination thereof.

According to the embodiment illustrated in FIG. 5, one or more of the ribs 118 may contain an opening 140 extending there through so as to provide a handle for moving and/or otherwise handling the pipe support 10. In FIG. 5, the opening extends through the wall 122, however, additionally and/or alternatively, the an opening 140 may also be formed through the wall 122 or on any other portion of the walls 100, 102, 104 and/or 106, the top surface 108 or any combination thereof.

With continued reference to FIG. 5, the base 112 includes a plurality of spaced apart reinforcing ribs 142 to provide additional rigidity to the base 112.

Referring specifically to FIG. 6, the saddle 118 contains two opposed ends 130 and 132, which are formed by top walls 134 of ribs 118 at each end of the saddle 116. In the embodiment illustrated in FIG. 6, the top walls 134 angularly extend downward from the bottommost surface 136 of the saddle 116 and angle 138. In some embodiments, the angle 138 is 3 degrees. However, it should be understood that the angle 138 can be larger or smaller. In operation, the angle 138 enables the pipe support 10 to accommodate pipes that are partially resting on the ground from the opposed end that is being supported on the pipe support 10.

Figure 8:
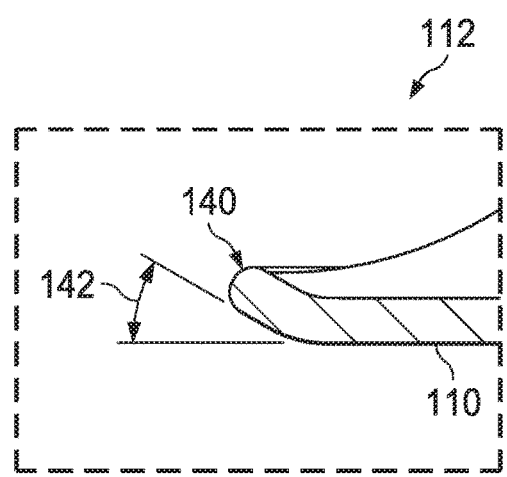
FIG. 8 is a detail view of a portion of the pipe support base illustrated in FIG. 7.

Referring now to FIG. 8, a portion of the base 112 is illustrated. In FIG. 8, the base 112 optionally includes an upturned or upwardly flared end 140 extending at an angle 142. According to some the angle 142 is 30 degrees from the bottom surface 110; however, it should be understood that the angle 142 can be a larger or smaller angle. In use, the upturned end 140 allows the pipe support 10 to tilt at slight angles to minimize stress and damage to the base 112 if/when the pipe support 10 tilts.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but on the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A pipe support for supporting a pipe section above a ground surface, the pipe support comprising:
   an upper support surface and at least one sidewall extending from the upper support surface to a base member, the upper support surface and the at least one sidewall forming a hollow interior;
   a saddle formed in the upper support surface, the saddle recessed within the support surface to support a pipe therein, the saddle having a first end and an opposed second end,
   at least one rib extending from the at least one sidewall and aligned with at least one of the first end or the second end of the saddle, the at least one rib having a top surface forming a portion of the saddle and a side surface, wherein the top surface angularly extends in a direction toward the base member and the side surface angularly extends from the top surface.

2. The pipe support of claim 1, wherein the at least one sidewall includes a front wall, a rear wall and a pair of sidewalls extending from the upper support surface forming the hollow interior.

3. The pipe support of claim 1, wherein the wherein the at least one sidewall extends from the upper support surface to the base member, the base member being square.

4. The pipe support of claim 1, wherein the rib has a triangular cross sectional shape.

5. The pipe support of claim 1, wherein the rib includes a first wall and a second wall intersecting at an apex.

6. The pipe support of claim 1, wherein the at least one sidewall includes an opening forming a handle.

7. The pipe support of claim 1, wherein the base member includes upturned ends.

8. The pipe support of claim 7, wherein the upturned ends angularly extend an angle of about 30 degrees from a bottom surface of the pipe support.

\* \* \* \* \*